United States Patent
Raghavan et al.

(10) Patent No.: US 12,368,481 B2
(45) Date of Patent: Jul. 22, 2025

(54) METHODS FOR INCORPORATING MISMATCHES BETWEEN RADIO FREQUENCY (RF) CONDITIONS OVER MEASUREMENT EPOCHS AND RF CONDITIONS OVER THE USAGE OF ADAPTIVE BEAM WEIGHT BEAMFORMING

(71) Applicant: QUALCOMM Incorporated, San Diego, CA (US)

(72) Inventors: Vasanthan Raghavan, West Windsor Township, NJ (US); Sinan Adibelli, San Diego, CA (US); Mohammad Ali Tassoudji, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 132 days.

(21) Appl. No.: 18/462,170

(22) Filed: Sep. 6, 2023

(65) Prior Publication Data

US 2025/0080181 A1    Mar. 6, 2025

(51) Int. Cl.
*H04B 7/06*    (2006.01)

(52) U.S. Cl.
CPC ................. *H04B 7/0617* (2013.01)

(58) Field of Classification Search
CPC ....... H04B 7/0617; H04B 7/0619; H04B 7/06
See application file for complete search history.

(56) References Cited

U.S. PATENT DOCUMENTS

| | | | |
|---|---|---|---|
| 2018/0227094 A1* | 8/2018 | Liu | H04B 7/06966 |
| 2020/0229008 A1* | 7/2020 | Islam | H04W 16/28 |
| 2022/0029679 A1* | 1/2022 | Pezeshki | H04B 7/0628 |

* cited by examiner

Primary Examiner — David S Huang
(74) Attorney, Agent, or Firm — Patterson+ Sheridan, L.L.P.

(57) ABSTRACT

Certain aspects of the present disclosure provide a method for wireless communications at a user equipment (UE). The UE transmits beamforming capability information indicating one or more adaptive beam weights. The UE receives, after outputting the beamforming capability information, an indication of beamforming adjustment phase information. The beamforming adjustment phase information is based on circuit-level information of the UE associated with at least one of an adaptive beam weight synthesis period or an adaptive beam weight usage period. The UE adjusts the one or more adaptive beam weights based on the indication.

22 Claims, 12 Drawing Sheets

METHODS FOR INCORPORATING MISMATCHES BETWEEN RADIO FREQUENCY (RF) CONDITIONS OVER MEASUREMENT EPOCHS AND RF CONDITIONS OVER THE USAGE OF ADAPTIVE BEAM WEIGHT BEAMFORMING

BACKGROUND

Field of the Disclosure

Aspects of the present disclosure relate to wireless communications, and more particularly, to techniques for managing adaptive beam weights.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications at a user equipment (UE). The method includes outputting, for transmission, beamforming capability information indicating one or more adaptive beam weights; obtaining, after outputting the beamforming capability information, an indication of beamforming adjustment phase information, wherein the beamforming adjustment phase information is based on circuit-level information of the UE associated with at least one of an adaptive beam weight synthesis period or an adaptive beam weight usage period; and adjusting the one or more adaptive beam weights based on the indication.

Another aspect provides a method for wireless communications at a network entity. The method includes obtaining beamforming capability information indicating one or more adaptive beam weights being used by a UE; and outputting, for transmission, after obtaining the beamforming capability information, an indication of beamforming adjustment phase information for adjusting the one or more adaptive beam weights, wherein the beamforming adjustment phase information is based on circuit-level information of the UE during an adaptive beam weight synthesis period and an adaptive beam weight usage period.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
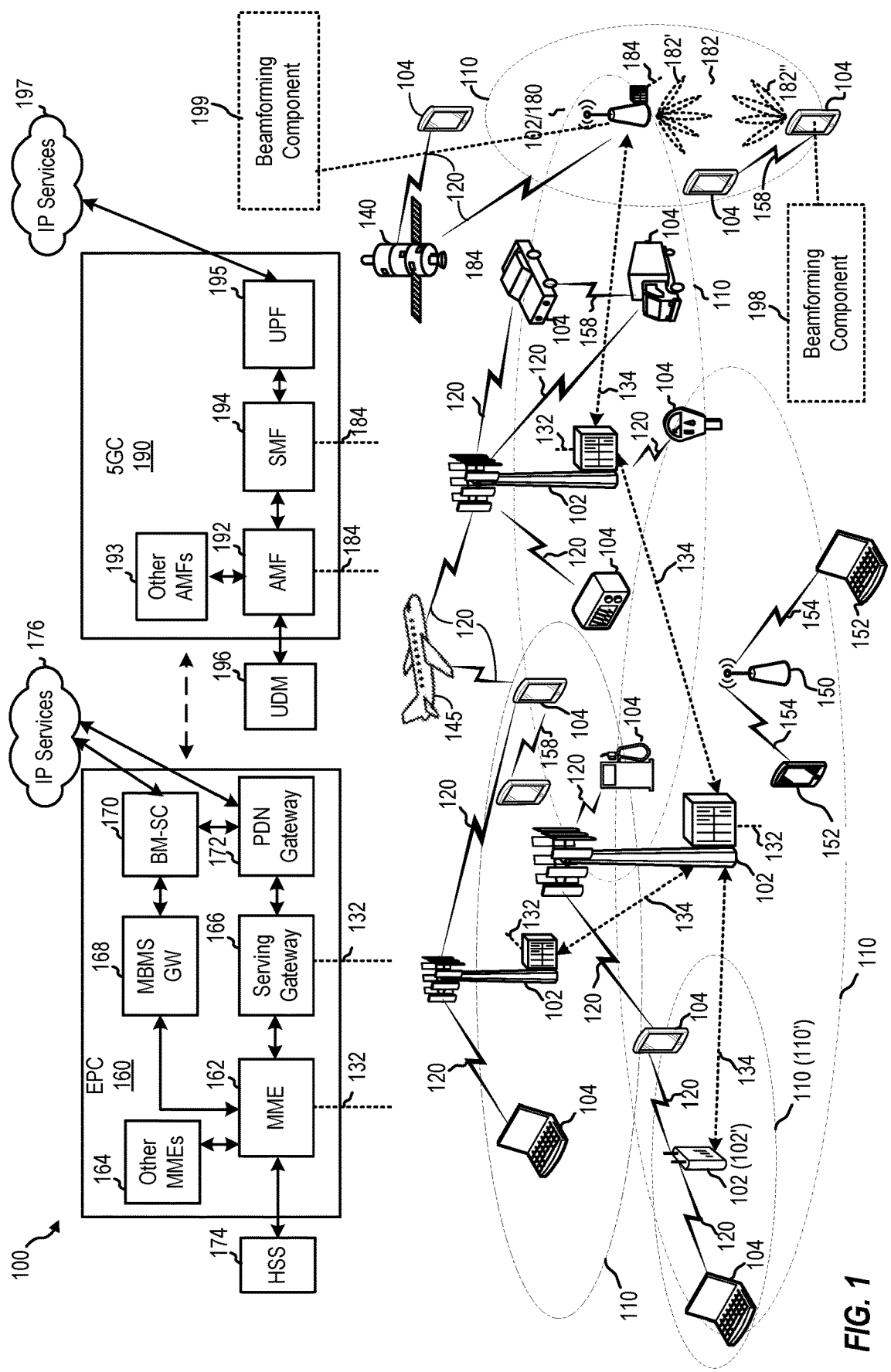
FIG. 1 depicts an example wireless communications network.

Aspects of the present disclosure provide apparatuses, methods, processing systems, and computer-readable mediums for managing adaptive beam weights constructed for use with hybrid beamforming at millimeter wave (mmW) frequencies.

In mmW systems, beamforming technologies are used to achieve directional signal transmission and reception as well as coherent power combining. This has become possible due to the ability to vary amplitude and phase over antenna elements in an antenna array in a beamforming system. Antenna arrays with provision of the amplitude/phase variation are employed for this purpose in a network node (e.g., a user equipment (UE) and/or base station as well as other intermediate/infrastructure nodes in the network). There are different types of beamforming such as analog beamforming, digital beamforming, and hybrid beamforming.

In analog beamforming, the amplitude/phase variation across the antenna elements is applied to an analog signal at a transmit end at a radio frequency (RF) of transmission with a single RF chain up converting a digital/baseband signal to the RF. At a receive end, the signals from the different antenna elements are summed up before analog-to-digital conversion. In digital beamforming, the amplitude/phase variation is applied to an up converted digital signal across each separate antenna element at the transmit end. At the receive end, the received signals from the antenna elements are first passed from analog-to-digital converters and processed at the baseband level with signal processing circuitry before a summation operation. In hybrid beamforming, advantages of both analog beamforming and digital beamforming are utilized. For example, here precoding is applied in both analog domain and digital domains. That is, precoding/beamforming is employed at both radio frequency (RF) and baseband.

In contrast to fixed beam weights that are used to steer beams in certain a priori chosen directions in the beamspace, beamforming with adaptive beam weights can be used in hybrid beamforming. Here, the selection of the beam weights in an adaptive manner is seen as an optimization problem over the choice of amplitudes and phases. A UE learns the adaptive beam weights based on signals from a gNodeB (gNB). The adaptive beam weights are based on (or can be viewed as) non-codebook based beamforming, in contrast to codebook-based beamforming systems (e.g., where measured and used beam weights are same).

However, in the non-codebook based beamforming (or adaptive beam weights based beamforming), initially a set of sampling beams are used to estimate or measure a channel impulse response (CIR). Based on beam measurements associated with the set of sampling beams, the UE may construct (or calculate) a set of adaptive beam weights, which are then used by the UE for transmit/receive operations. In some cases, since the set of sampling beams may be different from the learned/constructed adaptive beam weights, there is a likelihood of mismatch between measurements and usage of the adaptive beam weights. That is, the sampling beams used for the construction of the adaptive beam weights may induce different RF characteristics from RF characteristics presented when the constructed adaptive beam weights are used. This may be because there is a difference in a number of (active and inactive) antenna elements of the UE used in a learning phase of the adaptive beam weights and a usage (or communication) phase of the adaptive beam weights leading to impedance mismatches that are not accounted for.

Techniques proposed herein may assist a UE in determining potential adjustments for the constructed adaptive beam weights (e.g., to compensate for the mismatches in the RF characteristics). For this purpose, a gNB may initiate a beam weight adjustment phase after a beam weight learning phase and before a beam weight usage phase. During the beam weight adjustment phase, the potential adjustments are determined and applied to the constructed adaptive beam weights, to ensure there are no differences in beam characteristics (e.g., due to changes in the RF characteristics) between sampling beams used for the construction of the adaptive beam weights and the constructed adaptive beam weights. The potential adjustments may be based on UE circuit-level differences during the beam weight learning phase and the beam weight usage phase (e.g., differences in the number of (active and inactive) at the UE during the beam weight learning phase and the beam weight usage phase).

Particular aspects of the subject matter described in this disclosure can be implemented to realize one or more of the following potential advantages. In some examples, the described techniques can prevent or limit differences in the beam characteristics between the sampling beams used for construction of the adaptive beam weights and the constructed adaptive beam weights. This may improve overall beamforming and beam selection process, which may lead to increased communication reliability and better performance.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio BS, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
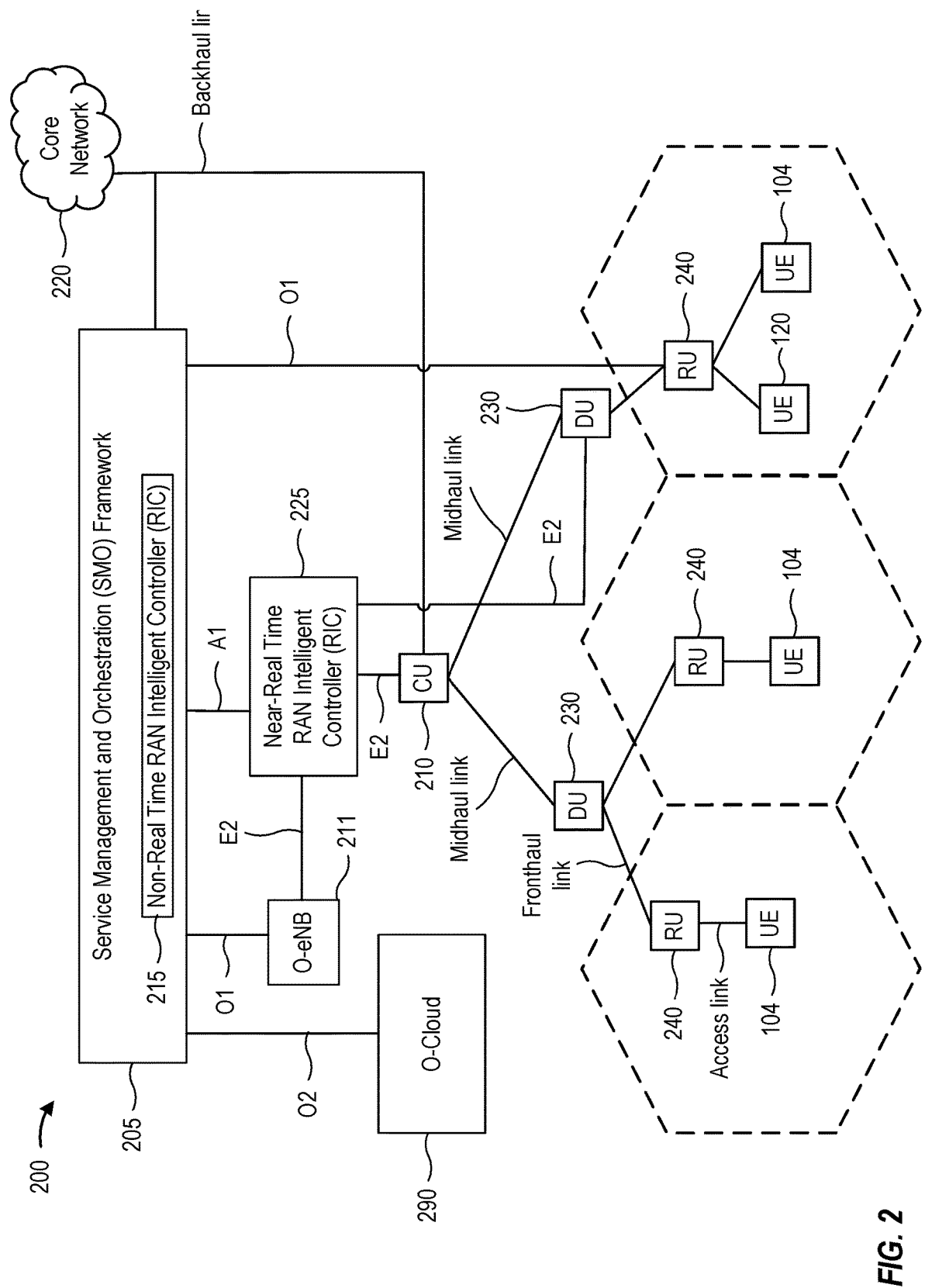
FIG. 2 depicts an example disaggregated base station (BS) architecture.

While BSs 102 are depicted in various aspects as unitary communications devices, BSs 102 may be implemented in various configurations. For example, one or more components of a BS 102 may be disaggregated, including a central unit (CU), one or more distributed units (Dus), one or more radio units (RUs), a Near-Real Time (Near-RT) RAN Intelligent Controller (RIC), or a Non-Real Time (Non-RT) RIC, to name a few examples. In another example, various aspects of a BS 102 may be virtualized. More generally, a BS (e.g., BS 102) may include components that are located at a single physical location or components located at various physical locations. In examples in which a BS 102 includes components that are located at various physical locations, the various components may each perform functions such that, collectively, the various components achieve functionality that is similar to a BS 102 that is located at a single physical location. In some aspects, a BS 102 including components that are located at various physical locations may be referred to as a disaggregated radio access network (RAN) architecture, such as an Open RAN (O-RAN) or Virtualized RAN (VRAN) architecture. FIG. 2 depicts and describes an example disaggregated BS architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHZ-6 GHz, which is often referred to (interchangeably) as "Sub-6 GHz". Similarly, 3GPP currently defines Frequency Range 2 (FR2) as including 26-41 GHz, which is sometimes referred to (interchangeably) as a "millimeter wave" ("mmW" or "mmWave"). A BS configured to communicate using mm Wave/near mmWave radio frequency bands (e.g., a mmWave BS such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain BSs (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

Figure 9:
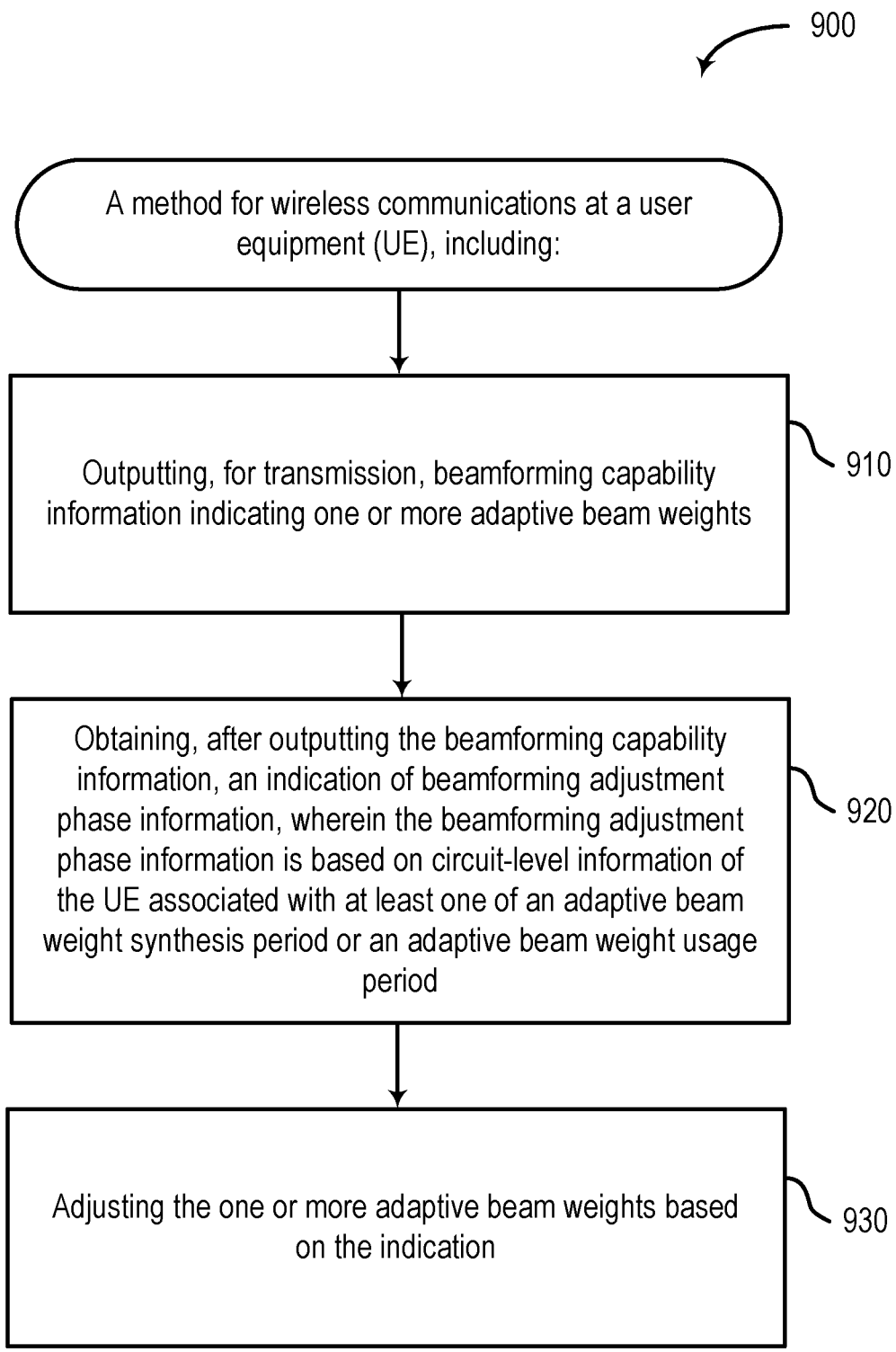
FIG. 9 depicts a method for wireless communications at a network node such as a UE.

Wireless communication network 100 further includes beamforming component 198, which may be configured to perform method 900 of FIG. 9. Wireless communication network 100 further includes beamforming component 199, which may be configured to perform method 1000 of FIG. 10.

In various aspects, a network entity or network node can be implemented as an aggregated BS, as a disaggregated BS, a component of a BS, an integrated access and backhaul (IAB) node, a relay node, a sidelink node, to name a few examples.

FIG. 2 depicts an example disaggregated BS 200 architecture. The disaggregated BS 200 architecture may include one or more central units (CUs) 210 that can communicate directly with a core network 220 via a backhaul link, or indirectly with the core network 220 through one or more disaggregated BS units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (Dus) 230 via respective midhaul links, such as an F1 interface. The Dus 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more BS functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUS 240 and Near-RT RICs 225. In some implementations, the SMO Framework 205 can communicate with a hardware aspect of a 4G RAN, such as an open eNB (O-cNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
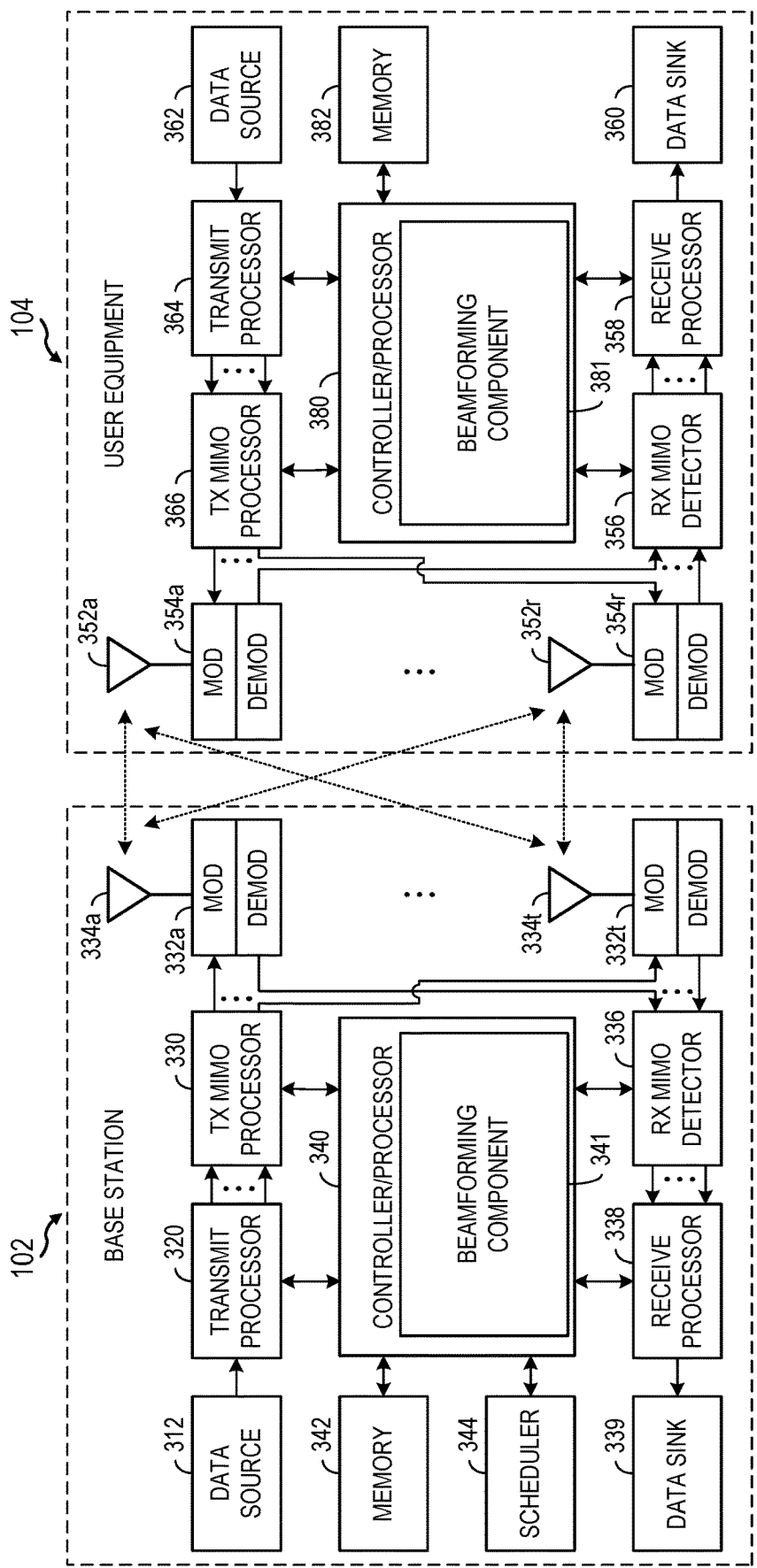
FIG. 3 depicts aspects of an example BS and an example user equipment (UE).

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

BS 102 includes controller/processor 340, which may be configured to implement various functions related to wireless communications. In the depicted example, controller/processor 340 includes beamforming component 341, which may be representative of beamforming component 199 of FIG. 1. Notably, while depicted as an aspect of controller/processor 340, beamforming component 341 may be implemented additionally or alternatively in various other aspects of BS 102 in other implementations.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

UE 104 includes controller/processor 380, which may be configured to implement various functions related to wireless communications. In the depicted example, controller/processor 380 includes beamforming component 381, which may be representative of beamforming component 198 of FIG. 1. Notably, while depicted as an aspect of controller/processor 380, beamforming component 381 may be implemented additionally or alternatively in various other aspects of UE 104 in other implementations.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs 104 for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t. RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIG. 4A, FIG. 4B, FIG. 4C, and FIG. 4D depict aspects of data structures for a wireless communications network, such as wireless communications network 100 of FIG. 1.

Figure 4:
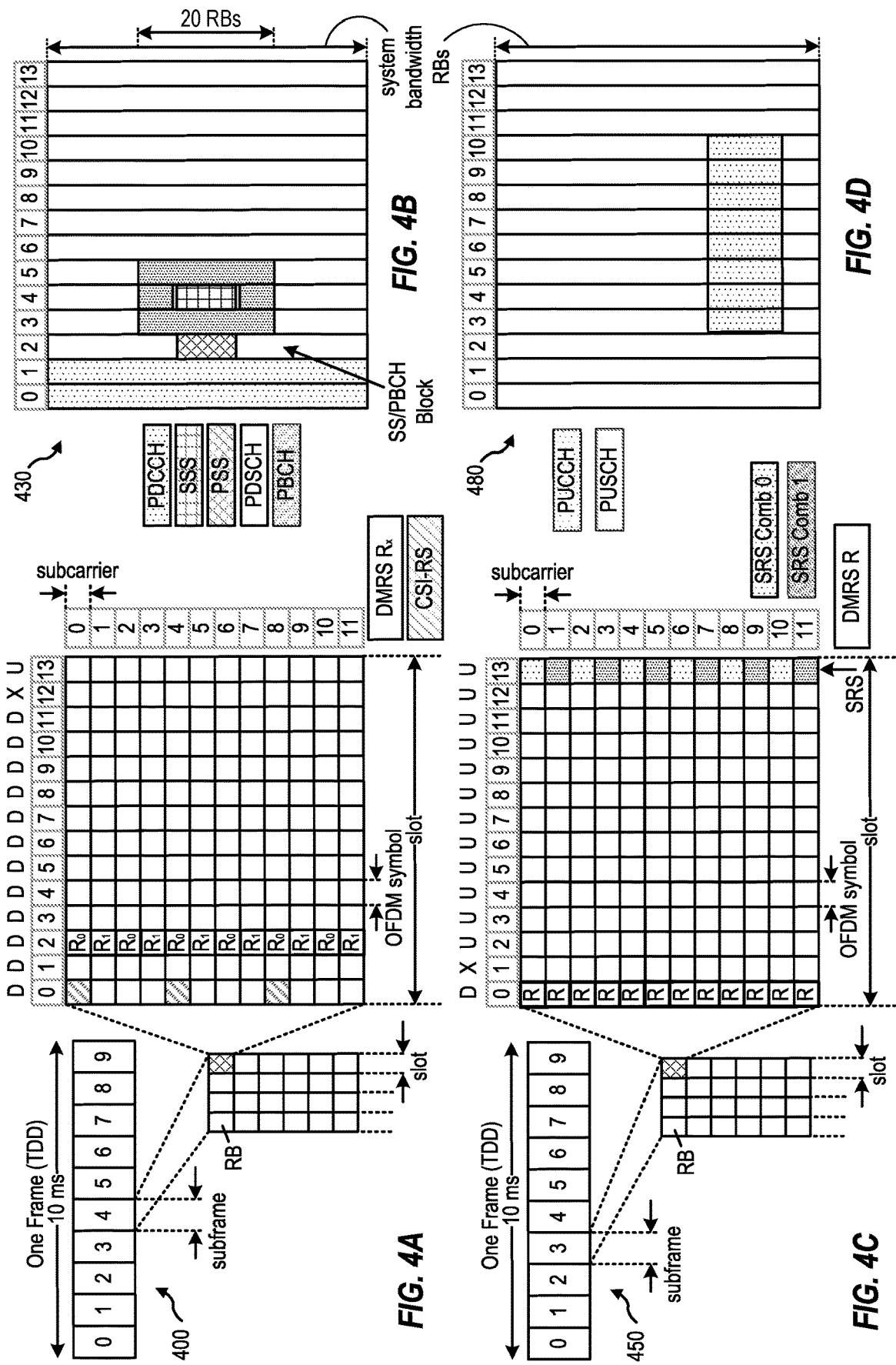
FIG. 4A, FIG. 4B, FIG. 4C, and FIG. 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIG. 4B and FIG. 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs 104 may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where u is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIG. 4A, FIG. 4B, FIG. 4C, and FIG. 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIG. 4A, FIG. 4B, FIG. 4C, and FIG. 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIG. 1 and FIG. 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIG. 1 and FIG. 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the BS. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a BS for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

$5^{th}$ generation (5G) networks may utilize several frequency ranges, which in some cases are defined by a standard, such as 3rd generation partnership project (3GPP) standards. For example, 3GPP technical standard TS 38.101 currently defines Frequency Range 1 (FR1) as including 600 MHZ-6 GHZ, though specific uplink and downlink allocations may fall outside of this general range. Thus, FR1 is often referred to (interchangeably) as a "Sub-6 GHz" band.

Similarly, TS 38.101-2 currently defines Frequency Range 2-1 (FR2-1) as including 24.25-52.6 GHZ, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHZ-300 GHz) that is identified by the International Telecommunications Union (ITU) as a "millimeter wave" band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. As described above with respect to FIG. 1, a base station (BS) (e.g., 180) configured to communicate using mmWave/near mmWave radio frequency bands may utilize beamforming (e.g., 182) with a user equipment (UE) (e.g., 104) to improve path loss and range.

Overview of Antenna Modules

A user equipment (UE) or any other network node may include at least one antenna module, which further includes one or more antenna arrays having a set of antennas (or antenna elements). The antenna module may include or is a linear antenna array or a planar antenna array.

Antenna polarization can be indicated via a direction in which an electric field of a radio wave oscillates while it propagates through a medium. A point of reference for specifying a polarization is looking at it from a transmitter of a signal. This can be visualized by imagining standing directly behind an antenna module or an antenna array, and looking in the direction it is aimed. In the case of a horizontal polarization (H), the electric field will move sideways in a horizontal plane. That is, an electric field vector of electro-magnetic wave is parallel to the earth. This is generated by having antenna modules or antenna arrays horizontal to the earth. For vertical polarization (V), the electric field is illustrated as oscillating up and down in a vertical plane. That is, the electric field vector of the electro-magnetic wave is perpendicular to the earth. This is generated by having the antenna modules or the antenna arrays vertical to the earth.

Overview of Beamforming

In millimeter wave (mmW) systems, beamforming technologies are used to increase array gain. For example, devices such as user equipments (UEs) and network entities (e.g., a gNodeB (gNB)) using wireless communication technologies may include multiple antenna arrays. Each antenna array may include one or more transmission and reception antennas that can be co-phased and are configured to transmit and receive communications over one or more spatial streams/layers. The use of the multiple antenna arrays may afford the ability to meet spherical coverage requirements with/without hand/body blockage as well as robustness with beam switching over the antenna arrays.

Increases in the antenna array gain facilitate a better quality of signal transmission and reception. To provide the antenna array gain in a particular direction, beamforming is considered. Beamforming is a technique that utilizes advanced antenna technologies on both UEs and gNBs to focus a wireless signal according to a set of beam weights (e.g., in a specific direction), rather than broadcasting to a wide area. For beamforming at a UE, it usually includes a UE receive (Rx) beam sweep from a set of different beams. Beamforming may improve signal-to-noise ratio (SNR) of received signals, eliminate undesirable interference sources, and focus the transmitted signals to specific locations.

Beamforming is also performed to establish a link between the gNB and the UE, where both these devices form a beam directed towards (but not limited to this possibility) each other. For example, both the gNB and the UE find at least one adequate beam to form a communication link between each other. gNB-beam and UE-beam form what is known as a beam pair link (BPL). As an example, on a downlink (DL), the gNB uses a transmit beam and the UE uses a receive beam corresponding to the transmit beam to receive a DL transmission. The combination of the transmit beam and the corresponding receive beam is the BPL.

Figure 5:
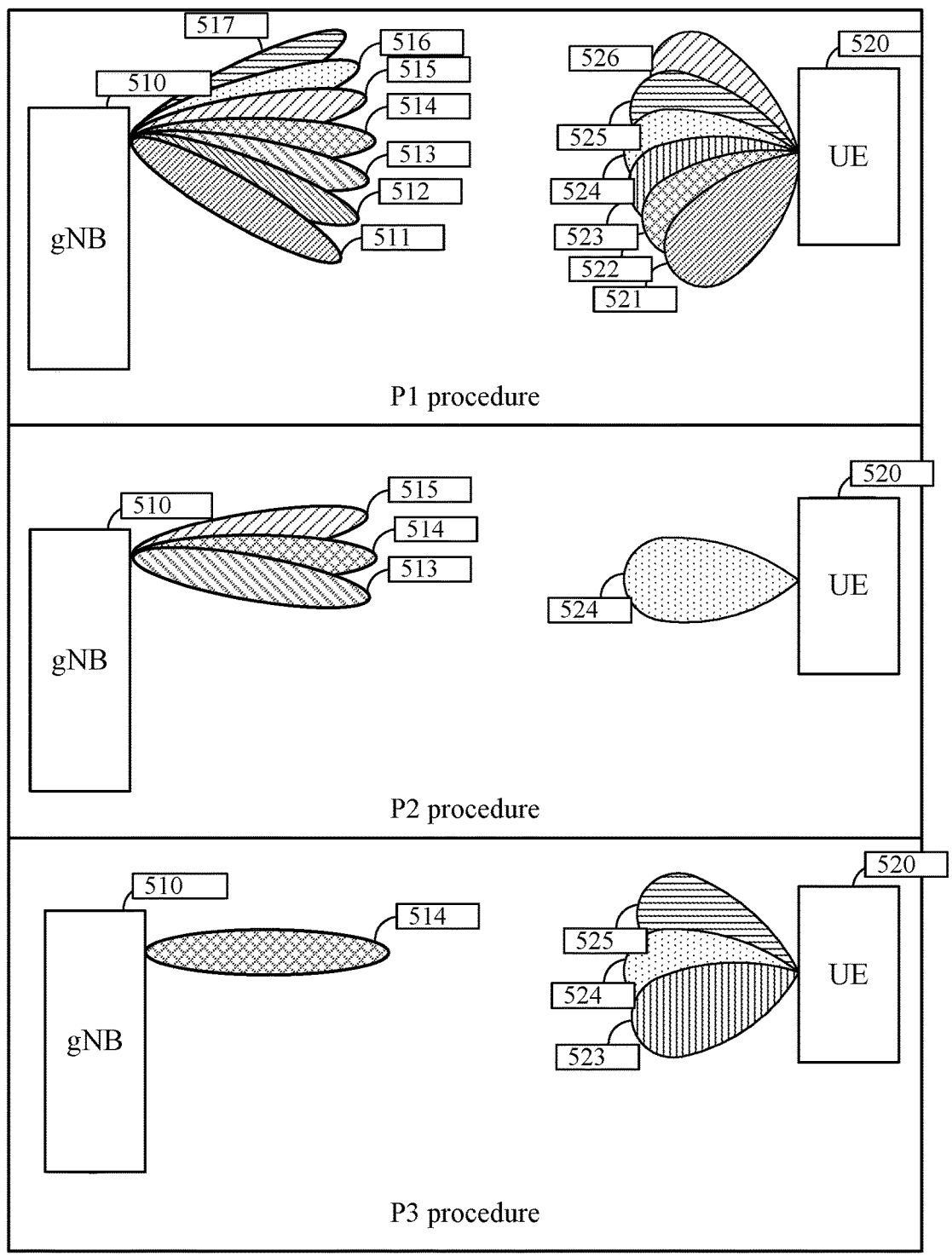
FIG. 5 depicts example beamforming and management procedures.

FIG. 5 illustrates an example procedure, referred to as a P1 procedure. A gNB 510 (e.g., the BS 102 of FIG. 1 and FIG. 3) may send a measurement request to a UE 520 (e.g., the UE 104 of FIG. 1 and FIG. 3), and may subsequently transmit one or more signals (sometimes referred to as a "P1-signal") to the UE 520 for measurement. In the P1 procedure, the gNB 510 transmits a signal with beam forming in a different spatial direction (corresponding to a transmit (TX) beam 511, 512, ..., 517) in each symbol, such that several (e.g., most or all) relevant spatial locations of a cell of the gNB 510 are reached. In this manner, the gNB 510 transmits the signal using different transmit beams over time in different directions. In some examples, a synchronization signal block (SSB) is used as the P1-signal. In some examples, a channel state information reference signal (CSI-RS), a demodulation reference signal (DMRS), or another downlink signal can be used as the P1-signal.

In the P1 procedure, to successfully receive at least a symbol of the P1-signal, the UE 520 finds (e.g., determines/selects) an appropriate receive (RX) beam (521, 522 . . . 526). Signals (e.g., SSBs) from multiple gNBs can be measured simultaneously for a given signal index (e.g., an SSB index) corresponding to a given time period. The UE 520 can apply a different receive beam during each occurrence (e.g., each symbol) of the P1-signal. Once the UE 520 succeeds in receiving a symbol of the P1-signal, the UE 520 and the gNB 510 have discovered a BPL (i.e., the UE RX beam used to receive the P1-signal in the symbol and the gNB TX beam used to transmit the P1-signal in the symbol). In some cases, the UE 520 does not search all of its possible UE RX beams until the UE 520 finds a best UE RX beam, since this causes additional delay. Instead, the UE 520 may select a RX beam once the RX beam is "good enough", for example, having a quality (e.g., an SNR or a signal to interference and noise ratio (SINR)) that satisfies a threshold (e.g., a predefined threshold). The UE 520 may not know which beam the gNB 510 used to transmit the P1-signal in a symbol; however, the UE 520 may report to the gNB 510 the time at which it observed the signal. For example, the UE 520 may report a symbol index in which the P1-signal was successfully received to the gNB 510. The gNB 510 may receive this report and determine which gNB TX beam the gNB 510 used at the indicated time. In some examples, the UE 520 measures signal quality of the P1-signal, such as a reference signal receive power (RSRP) or another signal quality parameter (e.g., an SNR, a channel flatness, etc.). The UE 520 may report the measured signal quality (e.g., a RSRP) to the gNB 510 together with the symbol index. In some cases, the UE 520 may report multiple symbol indices to the gNB 510, corresponding to multiple gNB TX beams.

As a part of a beamforming and management procedure, the BPL used between the UE 520 and the gNB 510 may be refined/changed. For example, the BPL may be refined periodically to adapt to changing channel conditions, for example, due to movement of the UE 520 or other objects, fading due to Doppler spread, etc. The UE 520 can monitor a quality of the BPL (e.g., a BPL found/selected during the P1 procedure and/or a previously refined BPL) to refine the BPL when the quality drops (e.g., when the BPL quality drops below a threshold or when another BPL has a higher quality). In 5G new radio (NR), the beamforming and management procedures for the beam refinement of the BPLs may be referred to as a P2 procedure and a P3 procedure to refine a gNB-beam and a UE-beam, respectively, of an individual BPL.

As shown in FIG. 5, for the P2 procedure, the gNB 510 transmits symbols of a signal with different gNB-beams (e.g., TX beams 515, 514, 513) that are spatially close to the gNB-beam of the current BPL. For example, the gNB 510 transmits the signal in different symbols using neighboring TX beams (e.g., beam sweeps) around the TX beam of the current BPL. As shown in FIG. 5, the TX beams used by the gNB 510 for the P2 procedure may be different from the TX beams used by the gNB 510 for the P1 procedure. For example, the TX beams used by the gNB 510 for the P2 procedure may be spaced closer together and/or may be more focused (e.g., narrower) than the TX beams used by the gNB 510 for the P1 procedure. During the P2 procedure, the UE 520 keeps its RX beam (e.g., RX beam 524) constant. The UE 520 may measure the signal quality (e.g., a RSRP) of the signal in the different symbols and indicate the symbol in which the highest signal quality was measured. Based on the indication, the gNB 510 can determine the strongest (e.g., best, or associated with the highest signal quality) TX beam (i.e., the TX beam used in the indicated symbol). The BPL can be refined accordingly to use the indicated TX beam.

As shown in FIG. 5, for the P3 procedure, the gNB 510 maintains a constant TX beam (e.g., the TX beam of the current BPL) and transmits symbols of a signal using the constant TX beam (e.g., TX beam 514). During the P3 procedure, the UE 520 scans the signal using different RX beams (e.g., RX beams 523, 524, 525) in different symbols. For example, the UE 520 may perform a sweep using neighboring RX beams to the RX beam in the current BPL (i.e., the BPL being refined). The UE 520 may measure the signal quality (e.g., a RSRP) of the signal for each RX beam and identify the strongest UE RX beam. The UE 520 may use the identified RX beam for the BPL. The UE 520 may report the signal quality to the gNB 510.

Overview of Adaptive Beam Weights

The purpose of beamforming is to achieve directional signal transmission and reception as well as coherent power combining. This has become possible due to provision of amplitude and phase variation in a beamforming system. Antenna arrays with provision of the amplitude/phase variation are employed for this purpose. There are different types of beamforming such as analog beamforming, digital beamforming, and hybrid beamforming.

In analog beamforming, the amplitude/phase variation is applied to an analog signal at a transmit end. At a receive end, the signals from different antennas are summed up before analog to digital conversion.

In digital beamforming, the amplitude/phase variation is applied to a digital signal after ADC/digital down converter (DDC) conversion at the transmit end. At the receive end, the received signals from the antennas are first passed from the ADC converters and the DDCs before a summation operation.

In hybrid beamforming, advantages of both analog beamforming and digital beamforming are utilized. For example, here precoding is applied to both analog domain and digital domains. That is, precoding/beamforming is employed at both radio frequency (RF) and baseband.

Adaptive beam weights are used in hybrid beamforming to address some issues such as co-phasing of energy across multiple independent clusters in a channel or to co-phase energy across a cluster with a wide angular spread, mismatches and imbalances across antenna polarizations which may be induced due to user equipment (UE) housing, and/or blockage distortions in electric fields (E fields) across the antenna polarizations.

The UE learns the adaptive beam weights based on signals from a gNodeB (gNB). For example, the UE may learn the adaptive beam weights based on synchronization signal blocks (SSBs) and/or reference signals (RSs) granted and sent to the UE by the gNB. Alternately, RSs can be sent from the UE to the gNB and learned at the gNB end and fed back to the UE. The adaptive beam weights are based on (or can be viewed as) non-codebook based beamforming, in contrast to codebook-based beamforming systems where certain directional energy steering beam weights are a priori designed and stored in a radio frequency integrated circuit (RFIC) memory of the UE.

There are some differences between the codebook-based beamforming and the non-codebook based beamforming procedures. For example, in the codebook-based beamforming, a certain set of beam weights are used by the UE, the UE estimates a reference signal received power (RSRP) and/or signal strength of signals based on the set of beam weights, and if the estimated RSRP/signal strength is good (e.g., based on some threshold), the UE uses the set of beam weights for further transmit/receive operations (e.g., may be with some adjustments for uplink and downlink operations). That is, the codebook-based beamforming corresponds to the what-you-see-is-what-you-get protocol (i.e., measured and used beam weights are same).

Figure 6:
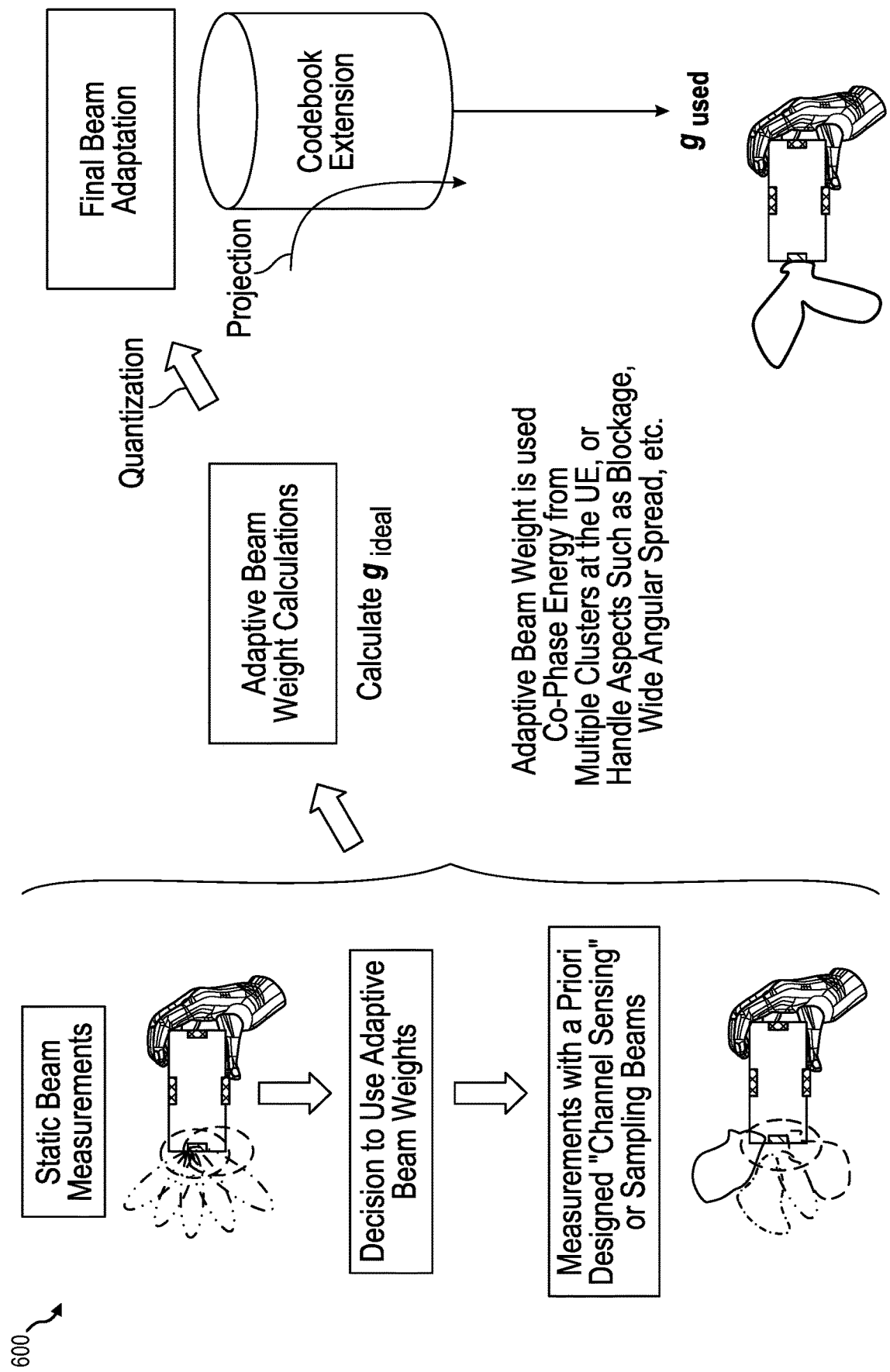
FIG. 6 depicts example adaptive beam weight learning.

However, in the non-codebook based beamforming (or adaptive beam weights based beamforming), as illustrated in a diagram 600 of FIG. 6, initially a set of sampling beams are used to estimate or measure a channel impulse response (CIR) and other beam quality values. Based on static beam measurements associated with the set of sampling beams, the UE may construct (or calculate) a set of adaptive beam weights (e.g., gideal), which are then used by the UE for the transmit/receive operations. In some cases, since the set of sampling beams may be different from the learned/constructed adaptive beam weights, there is a likelihood of mismatch between measurements and usage of the adaptive beam weights. That is, the sampling beams used for construction of the adaptive beam weights may be different in beam characteristics from the constructed adaptive beam weights.

For example, for a 2×1 antenna array of the UE, the UE may use [1 0], [0 1], [1 1] and [1 i] as sampling beam weights. Here, [1 0] represents selection or use of only first antenna element. [0 1] represents selection or use of only second antenna element, [1 1] represents selection of equal weights for the first and second antenna elements, [1 i] represents selection or use of the first antenna element and ninety degrees phase shift for the second antenna element with a same amplitude. The constructed adaptive beam weight may be of a form $[1\ e^{j\theta}]$ for some $\theta$ (e.g., phase value from within a phase shifter set).

In another example, for a 3×1 antenna array of the UE, the UE may use [1 0 0]. [0 1 0], [0 0 1], [1 1 0], [1 i 0], [1 0 1] and [1 0 i] as sampling beam weights. In some symbols/time instances, the sampling beam weights may indicate the use of one active antenna element, whereas in some other symbols/instances, the sampling beams may indicate the use of two active antenna elements. For example, the first three instances of the sampling beam weights may indicate selection or use of one antenna element, and the last four instances of the sampling beam weights may indicate selection or use of two antenna elements. The constructed adaptive beam weights (e.g., based on the sampling beam weights) may be of a form $[1\ e^{j\theta}\ e^{j\varphi}]$ (e.g., for some $\theta$ and $\varphi$ phase values from within a phase shifter set). That is, the adaptive beam weights may render all three antenna elements as being active (although the input set of the sampling beam weights during a learning phase of the adaptive beam weights are going to excite either one or two antenna elements only).

Accordingly, there may be some mismatch between a number of (active and inactive) antenna elements used in the learning phase of the adaptive beam weights as opposed to the usage phase of the adaptive beam weights. The antenna elements that are inactive or turned OFF may have a different termination compared to the antenna elements that are active and turned ON. For example, the turned ON antenna elements may have active circuit components (e.g., such as phase shifters, low noise amplifiers (LNAs) and power amplifiers), whereas the turned OFF antenna elements may have these circuit components open.

Since the termination of the antenna elements may lead to different circuit behavior across the symbols/time instances (e.g., used in the learning phase), an active impedance mismatch may be induced in different symbols/time instances. Any differences in the active impedances may lead to different phases produced in the learning and usage phases of the adaptive beam weights even though the phases are set appropriately. In some cases, these impedance differences may be managed with an antenna tuner (e.g., which matches antenna impedances), but this may come at a high cost of use of an additional component (e.g., the tuner) in a limited space of the UE.

Aspects Related to Incorporating Mismatches Between Measurements and Usage of Adaptive Beam Weight Beamforming Aspects of the present disclosure provide apparatuses, methods, processing systems, and computer-readable mediums for managing adaptive beam weights.

For example, techniques proposed herein may assist a user equipment (UE) to determine potential adjustments for constructed adaptive beam weights based on sampling beams. For this purpose, a gNodeB (gNB) may initiate a beam weight adjustment phase after a beam weight learning phase and before a beam weight usage phase. During the beam weight adjustment phase, the potential adjustments may be applied to the constructed adaptive beam weights, to ensure there are no differences in beam characteristics between the sampling beams used for construction of the adaptive beam weights and the constructed adaptive beam weights. The potential adjustments are based on UE circuit-level differences during the beam weight learning phase and the beam weight usage phase (e.g., differences in a number of active antenna elements at the UE during the beam weight learning phase and the beam weight usage phase).

Particular aspects of the subject matter described in this disclosure can be implemented to realize one or more of the following potential advantages. In some examples, the described techniques can prevent or limit differences in the beam characteristics between the sampling beams used for construction of the adaptive beam weights and the constructed adaptive beam weights. This may improve beamforming process, which may lead to increased communication reliability and better performance.

The techniques proposed herein for incorporating mismatches between measurements and usage of adaptive beam weight beamforming may be understood with reference to FIG. 7-FIG. 12.

Figure 7:
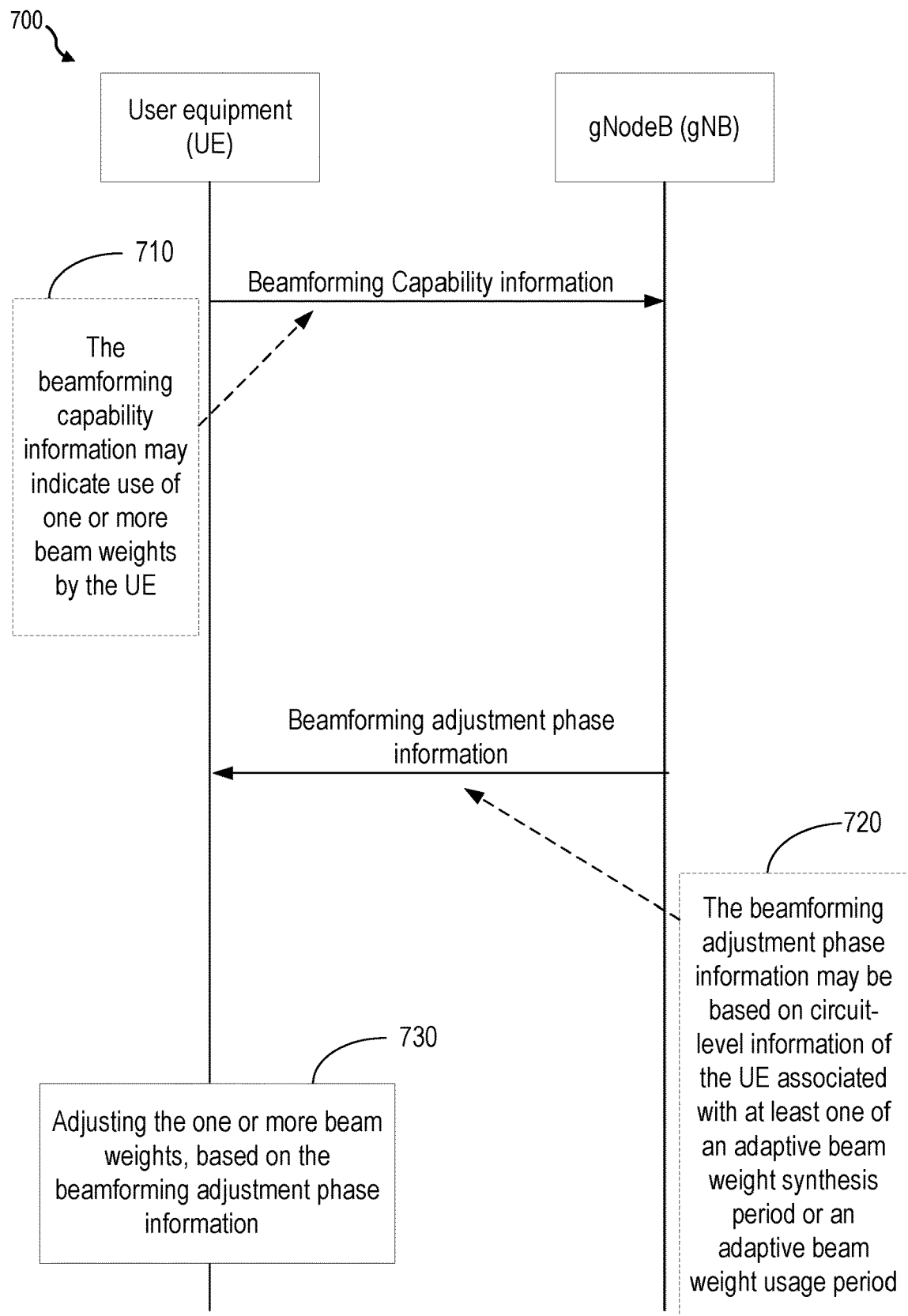
FIG. 7 depicts a call flow diagram illustrating example communication among a UE and a network entity.
Figure 8:
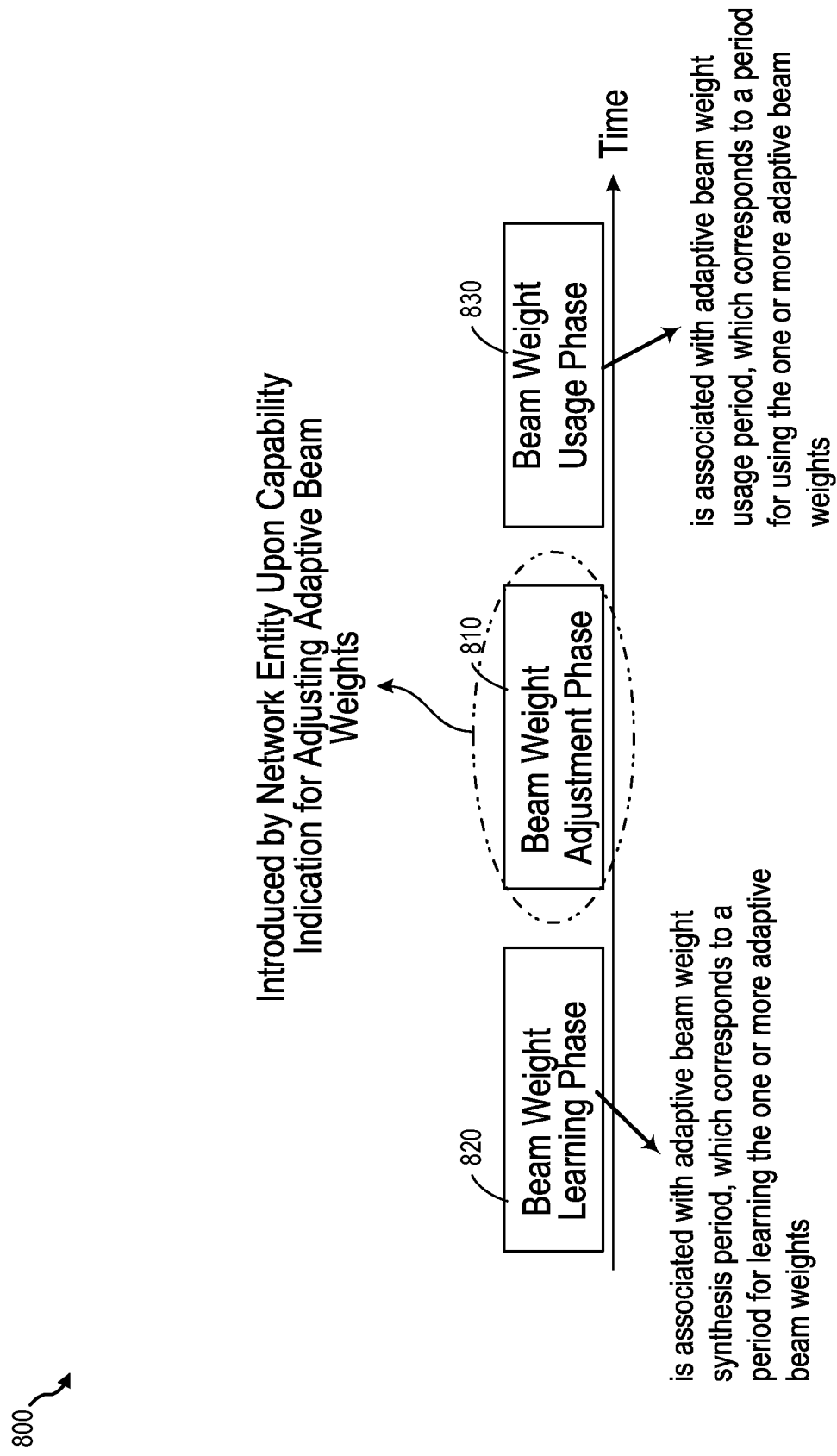
FIG. 8 depicts example beamforming phases.

FIG. 7 depicts a call flow diagram 700 illustrating example communication among a UE and a network entity (e.g., a gNB) for incorporating mismatches between measurements and usage of adaptive beam weight beamforming. The UE shown in FIG. 7 may be an example of the UE 104 depicted and described with respect to FIG. 1 and FIG. 3. The gNB depicted in FIG. 7 may be an example of the BS 102 depicted and described with respect to FIG. 1 and FIG. 3, or the disaggregated BS depicted and described with respect to FIG. 2.

As indicated at 710, the UE transmits beamforming capability information to the gNB (e.g., for assistance with beam training). The beamforming capability information may indicate use of one or more adaptive beam weights by the UE.

In certain aspects, one or more sampling beams may be used for construction of the one or more adaptive beam weights. In some cases, the one or more sampling beams may be different in beam characteristics from the constructed adaptive beam weights.

As indicated at 720, the gNB transmits beamforming adjustment phase information to the UE, in response to the beamforming capability information.

In certain aspects, the beamforming adjustment phase information may be based on circuit-level information of the UE associated with an adaptive beam weight synthesis period. The adaptive beam weight synthesis period may correspond to a period for learning of the one or more adaptive beam weights by the UE. The circuit-level information includes a first quantity of active components of a circuit of the UE during the adaptive beam weight synthesis period. The circuit-level information may also include a first quantity of inactive components of the circuit of the UE during the adaptive beam weight synthesis period.

The first quantity of active components may include active (or turned ON) antenna elements, phase shifters, low noise amplifiers (LNAs), and/or power amplifiers of the UE. The first quantity of inactive components may include inactive (or turned OFF) antenna elements, phase shifters, LNAs, and/or power amplifiers of the UE. In one example, the gNB may obtain information associated with the first quantity of active components and the first quantity of inactive components from the UE. In another example, the gNB may determine on its own the information associated with the first quantity of active components and the first quantity of inactive components of the UE.

In certain aspects, the beamforming adjustment phase information may be based on circuit-level information of the UE associated with an adaptive beam weight usage period. The adaptive beam weight usage period may correspond to a period for using the one or more adaptive beam weight by the UE. The circuit-level information may include a second quantity of the active components of the circuit of the UE during the adaptive beam weight usage period. The circuit-level information may include a second quantity of inactive components of the circuit of the UE during the adaptive beam weight usage period.

The second quantity of active components may include active antenna elements, phase shifters, LNAs, and/or power amplifiers of the UE. The second quantity of inactive components may include inactive antenna elements, phase shifters, LNAs, and/or power amplifiers of the UE. In one example, the gNB may obtain information associated with the second quantity of active components and the second quantity of inactive components from the UE. In another example, the gNB may determine on its own the information associated with the second quantity of active components and the second quantity of inactive components of the UE.

In certain aspects, the first quantity of the active components may be different than the second quantity of the active components. For example, the first quantity of the active components may include five active antenna elements at the UE during the adaptive beam weight synthesis period, and the second quantity of the active components may include seven active antenna elements at the UE during the adaptive beam weight usage period. That is, a number of active antenna elements are different between a learning phase and a usage phase (or a potential usage phase) of the adaptive beam weights.

In certain aspects, the first quantity of the inactive components may be different than the second quantity of the inactive components. For example, the first quantity of the inactive components may include two inactive antenna elements at the UE during the adaptive beam weight synthesis period, and the second quantity of the inactive components may include three inactive antenna elements at the UE during the adaptive beam weight usage period. That is, a number of inactive antenna elements are different between the learning phase and the usage phase of the adaptive beam weights.

In certain aspects, the beamforming adjustment phase information may request the UE to use the one or more sampling beams (e.g., which were used by the UE in the learning phase of the one or more adaptive beam weights) with a same number of antenna elements as eventually used in the adaptive beam weights. This request may ensure that there are minimal or no mismatches between the learning phase of the one or more adaptive beam weights and the usage phase of the one or more adaptive beam weights. In some cases, the gNB may not intrude into UE implementation and usage of the sampling beams by the UE.

As indicated at 730, the UE adjusts the one or more adaptive beam weights based on the beamforming adjustment phase information. For example, the UE may calculate a value of a beam weight adjustment (e.g., five active antenna elements) based on the beamforming adjustment phase information. The UE may then adjust a value of an adaptive beam weight (e.g., which was based on three active antenna elements) based on the value of the beam weight adjustment. For example, the UE may adjust or reconstruct the adaptive beam weights based on the same number of antenna elements and other circuit components that were used/active during the learning phase.

In certain aspects, the UE may receive (e.g., after transmitting the beamforming capability information) beamforming assistance information from the gNB. The beamforming assistance information may include a quantity of reference signals (RSs) to be transmitted by the gNB to the UE for a beam weight adjustment learning phase at the UE. The adjusting of the one or more adaptive beam weights occurs during the beam weight adjustment learning phase. In some cases, as illustrated in a diagram 800 of FIG. 8, the beam weight adjustment learning phase (e.g., beam weight adjustment phase 810) may be introduced by the gNB after a beam weight learning phase 820 (e.g., which is associated with the adaptive beam weight synthesis period) and before a beam weight usage phase 830 (e.g., which is associated with the adaptive beam weight usage period).

The beamforming assistance information may also include a type of each RS from the quantity of RSs. The beamforming assistance information may also include a transmission time of each RS from the quantity of RSs to the UE. In one example, the quantity of RSs may be based on the one or more adaptive beam weights. In another example, the quantity of RSs may be based on a quantity of antenna elements activated by the one or more adaptive beam weights at the UE.

In certain aspects, the UE may perform measurements (e.g., signal strength and other measurements) for one or more RSs from the quantity of RSs. The UE may generate a beam weight adjustment matrix based on at least the measurements associated with the one or more RSs from the quantity of RSs. The beam weight adjustment matrix may also be based on a quantity of antenna elements (maybe active antenna elements) at the UE during the measurement operation and/or the learning phase. The beam weight adjustment matrix may also be based on a quantity and performance of radio frequency integrated circuits (RFICs) at the UE during the measurement operation and/or the learning phase.

In certain aspects, the UE may adjust current values of the one or more adaptive beam weights based on information associated with the beam weight adjustment matrix. For example, the UE adjusts the current values of the one or more adaptive beam weights to true values of the one or more adaptive beam weights. The adjustment is based on an application of the beam weight adjustment matrix on the current values of the one or more adaptive beam weights.

For example, the gNB can assist the UE in determining adjustments for use with constructed adaptive beam weights. When a system is linear, true adaptive beam weights ($g_{true}$) to be used by the UE may be of a form $A_{adjustment} \, g_{learned}$, where $A_{adjustment}$ is an unknown but deterministic N×N matrix. Here, N indicates a number of antenna elements at the UE. In some cases, the UE may determine $A_{adjustment}$ as a UE implementation function. In some cases, the UE may not be able to determine/learn $A_{adjustment}$ (e.g., because the UE may need to know the accurate behavior of RFIC, which is typically possible only in a premium-tier UE with no constraints on cost overruns/calibration complexity/possibility of online calibration, etc.) and obtains/receives $A_{adjustment}$ from the gNB.

In certain aspects, the UE may adjust the current values of the one or more adaptive beam weights to the true values of the one or more adaptive beam weights, each time the beamforming capability information indicating the one or more adaptive beam weights is outputted by the UE. For example, the adjustment of the one or more adaptive beam weights may be beam-dependent and can be done every time UE may indicate usage of (new) adaptive beam weights to the gNB.

In certain aspects, the UE may adjust a current value of an adaptive beam weight to a first true value of the adaptive beam weight (e.g., for an uplink operation) and a second true value of the adaptive beam weight (e.g., for a downlink operation). The first true value is different from the second true value. That is, since there are differences in uplink and downlink operations (i.e., different active circuit components of the UE are used during the uplink and downlink operations), the adjustment of the one or more adaptive beam weights may be different for uplink and downlink.

In certain aspects, the UE may semi-persistently adjust the current values of the one or more adaptive beam weights to the true values of the one or more adaptive beam weights after each defined time interval. For example, the adjustment of the one or more adaptive beam weights may be beam-independent and can be done semi-persistently or on a long-term basis (one shot).

Example Method for Wireless Communications at a User Equipment (UE)

FIG. 9 shows an example of a method 900 for wireless communications at a network node such as a user equipment (UE) (e.g., the UE 104 of FIG. 1 and FIG. 3).

Method 900 begins at step 910 with outputting, for transmission, beamforming capability information indicating one or more adaptive beam weights. In some cases, the operations of this step refer to, or may be performed by, circuitry for outputting and/or code for outputting as described with reference to FIG. 11.

Method 900 then proceeds to step 920 with obtaining, after outputting the beamforming capability information, an indication of beamforming adjustment phase information. The beamforming adjustment phase information is based on circuit-level information of the UE associated with at least one of an adaptive beam weight synthesis period or an adaptive beam weight usage period. In some cases, the operations of this step refer to, or may be performed by, circuitry for obtaining and/or code for obtaining as described with reference to FIG. 11.

Method 900 then proceeds to step 930 with adjusting the one or more adaptive beam weights based on the indication. In some cases, the operations of this step refer to, or may be performed by, circuitry for adjusting and/or code for adjusting as described with reference to FIG. 11.

In certain aspects, the adaptive beam weight synthesis period corresponds to a period for learning the one or more adaptive beam weights.

In certain aspects, the adaptive beam weight usage period corresponds to a period for using the one or more adaptive beam weights.

In certain aspects, the circuit-level information includes a first quantity of active components of a circuit of the UE during the adaptive beam weight synthesis period and a second quantity of the active components of the circuit of the UE during the adaptive beam weight usage period.

In certain aspects, the first quantity of the active components is different than the second quantity of the active components.

In certain aspects, the method 900 further includes calculating a value of a beam weight adjustment based on the beamforming adjustment phase information; and adjusting a value of an adaptive beam weight based on the value of the beam weight adjustment.

In certain aspects, the value of the adaptive beam weight indicates a first quantity of active antenna elements at the UE; the value of the beam weight adjustment indicates a second quantity of active antenna elements at the UE; and the first quantity of active antenna elements is different from the second quantity of active antenna elements.

In certain aspects, the method 900 further includes obtaining, after outputting the beamforming capability information, beamforming assistance information indicating a quantity of reference signals (RSs) to be transmitted to the UE for a beam weight adjustment learning phase at the UE, wherein the adjusting of the one or more adaptive beam weights occurs during the beam weight adjustment learning phase.

In certain aspects, the quantity of RSs is based on at least one of: the one or more adaptive beam weights or a quantity of antenna elements activated by the one or more adaptive beam weights at the UE.

In certain aspects, the beamforming assistance information indicates at least one of: a type of each RS from the quantity of RSs or a transmission time of each RS from the quantity of RSs to the UE.

In certain aspects, the method 900 further includes adjusting a current value of an adaptive beam weight based on a beam weight adjustment matrix corresponding to measurements associated with one or more RSs from the quantity of RSs.

In certain aspects, the beam weight adjustment matrix is based on a quantity of antenna elements at the UE.

In certain aspects, the beam weight adjustment matrix is based on a quantity and performance of radio frequency integrated circuits (RFICs) at the UE.

In certain aspects, the method 900 further includes adjusting the current value of the adaptive beam weight to a true value of the adaptive beam weight, said adjustment being based on an application of the beam weight adjustment matrix on the current value of the adaptive beam weight.

In certain aspects, the method 900 further includes adjusting a current value of an adaptive beam weight to a true value of the adaptive beam weight, said adjustment occurring each time the beamforming capability information indicating the one or more adaptive beam weights is outputted.

In certain aspects, the method 900 further includes adjusting a current value of an adaptive beam weight to: a first true value of the adaptive beam weight for an uplink operation and a second true value of the adaptive beam weight for a downlink operation, wherein the first true value is different from the second true value.

In certain aspects, the method 900 further includes semi-persistently adjusting a current value of an adaptive beam weight to a true value of the adaptive beam weight, said adjustment occurring after each defined time interval.

Figure 11:
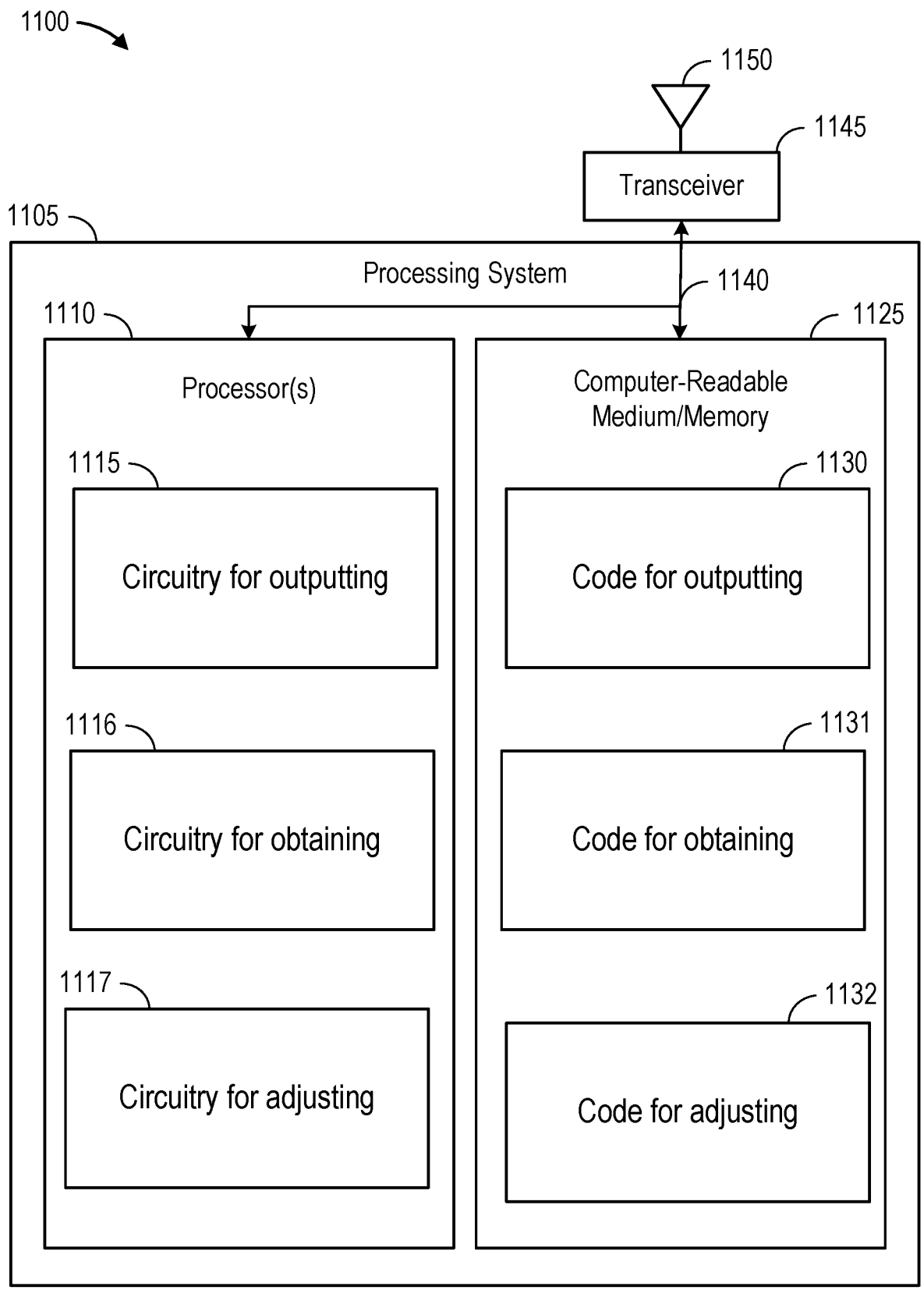
FIG. 11 and FIG. 12 depict example communications devices.

In one aspect, the method 900, or any aspect related to it, may be performed by an apparatus, such as a communications device 1100 of FIG. 11, which includes various components operable, configured, or adapted to perform the method 900. The communications device 1100 is described below in further detail.

Note that FIG. 9 is just one example of a method, and other methods including fewer, additional, or alternative steps are possible consistent with this disclosure.

Example Method for Wireless Communications at a Network Entity

Figure 10:
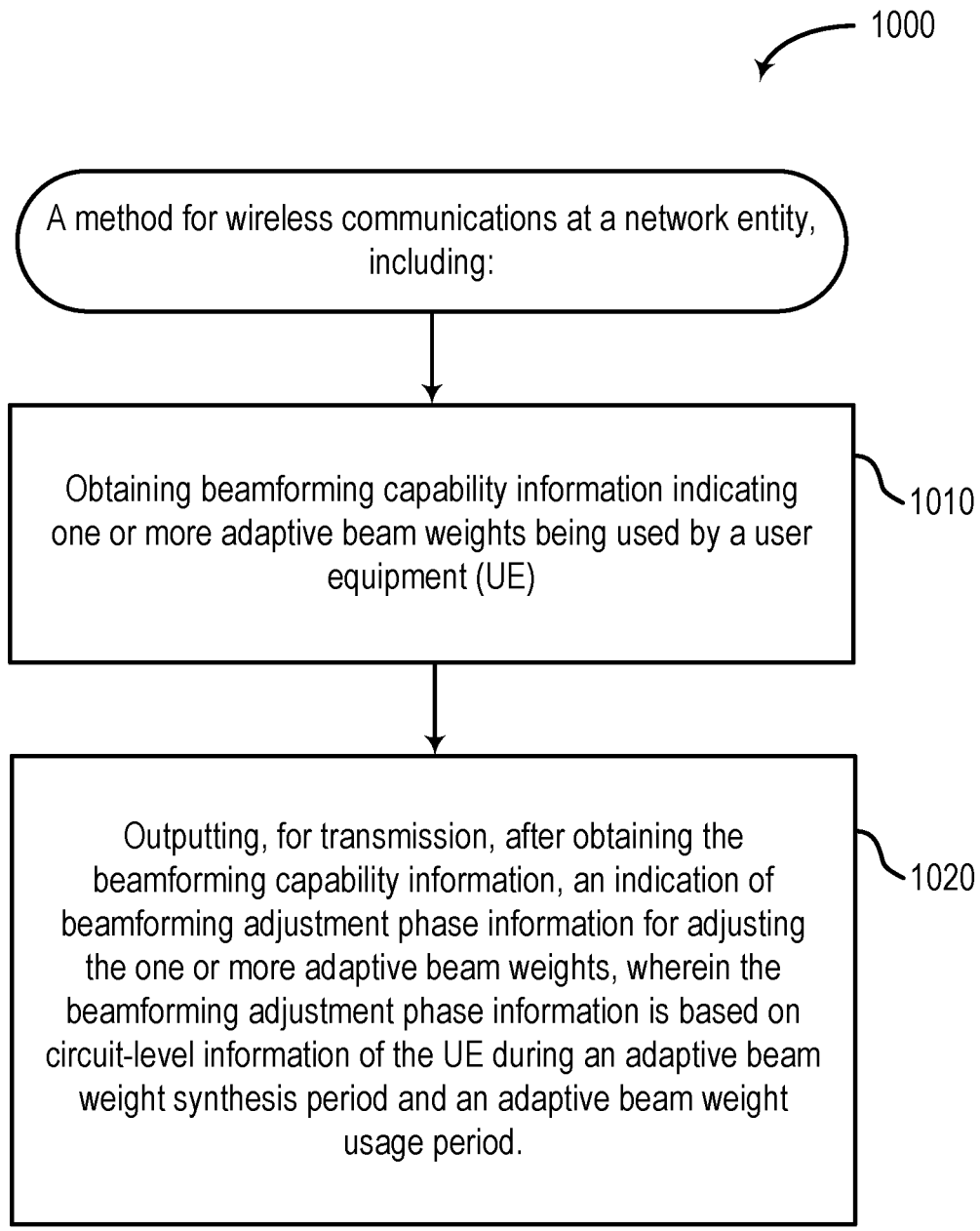
FIG. 10 depicts a method for wireless communications at a network node such as a network entity.

FIG. 10 shows an example of a method 1000 for wireless communications at a network node such as a network entity (e.g., the BS 102 of FIG. 1 and FIG. 3).

Method 1000 begins at step 1010 with obtaining beamforming capability information indicating one or more adaptive beam weights being used by a user equipment (UE). In some cases, the operations of this step refer to, or may be performed by, circuitry for obtaining and/or code for obtaining as described with reference to FIG. 12.

Method 1000 then proceeds to step 1020 with outputting, for transmission, after obtaining the beamforming capability information, an indication of beamforming adjustment phase information for adjusting the one or more adaptive beam weights. The beamforming adjustment phase information is based on circuit-level information of the UE during an adaptive beam weight synthesis period and an adaptive beam weight usage period. In some cases, the operations of this step refer to, or may be performed by, circuitry for outputting and/or code for outputting as described with reference to FIG. 12.

In certain aspects, the adaptive beam weight synthesis period corresponds to a period for learning the one or more adaptive beam weights.

In certain aspects, the adaptive beam weight usage period corresponds to a period for using the one or more adaptive beam weights.

In certain aspects, the circuit-level information includes a first quantity of active components of a circuit of the UE during the adaptive beam weight synthesis period and a second quantity of the active components of the circuit of the UE during the adaptive beam weight usage period.

In certain aspects, the first quantity of the active components is different than the second quantity of the active components.

In certain aspects, the method 1000 further includes outputting, for transmission, after obtaining the beamforming capability information, beamforming assistance information indicating a quantity of reference signals (RSs) to be transmitted to the UE for a beam weight adjustment learning phase at the UE.

In certain aspects, the quantity of RSs is based on at least one of: the one or more adaptive beam weights or a quantity of antenna elements activated by the one or more adaptive beam weights at the UE.

In certain aspects, the beamforming assistance information indicates at least one of: a type of each RS from the quantity of RSs or a transmission time of each RS from the quantity of RSs to the UE.

Figure 12:
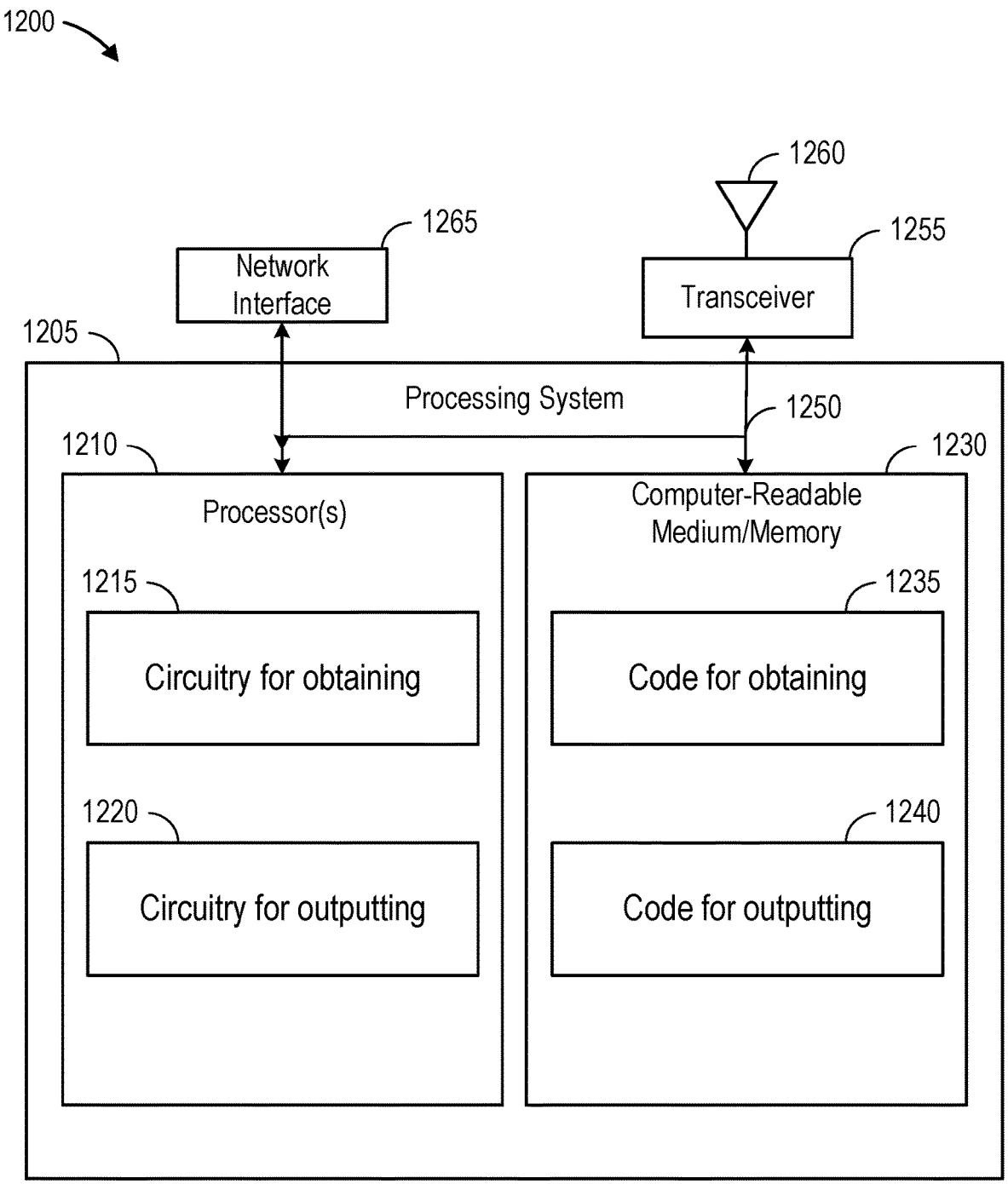

In one aspect, the method 1000, or any aspect related to it, may be performed by an apparatus, such as a communications device 1200 of FIG. 12, which includes various components operable, configured, or adapted to perform the method 1000. The communications device 1200 is described below in further detail.

Note that FIG. 10 is just one example of a method, and other methods including fewer, additional, or alternative steps are possible consistent with this disclosure.

Example Communications Devices

FIG. 11 depicts aspects of an example communications device 1100. In some aspects, the communications device 1100 is a user equipment (UE), such as UE 104 described above with respect to FIG. 1 and FIG. 3.

The communications device 1100 includes a processing system 1105 coupled to a transceiver 1145 (e.g., a transmitter and/or a receiver). The transceiver 1145 is configured to transmit and receive signals for the communications device 1100 via an antenna 1150, such as the various signals as described herein. The processing system 1105 may be configured to perform processing functions for the communications device 1100, including processing signals received and/or to be transmitted by the communications device 1100.

The processing system 1105 includes one or more processors 1110. In various aspects, the one or more processors 1110 may be representative of one or more of receive processor 358, transmit processor 364, TX MIMO processor 366, and/or controller/processor 380, as described with respect to FIG. 3. The one or more processors 1110 are coupled to a computer-readable medium/memory 1125 via a bus 1140. In certain aspects, the computer-readable medium/memory 1125 is configured to store instructions (e.g., computer-executable code) that when executed by the one or more processors 1110, cause the one or more processors 1110 to perform the method 900 described with respect to FIG. 9, and/or any aspect related to it. Note that reference to a processor performing a function of communications device 1100 may include the one or more processors 1110 performing that function of communications device 1100.

In the depicted example, computer-readable medium/memory 1125 stores code (e.g., executable instructions), such as code for outputting (or transmitting) 1130, code for obtaining (or receiving) 1131, and code for adjusting 1132. Processing of the code for outputting 1130, the code for obtaining 1131, and the code for adjusting 1132 may cause the communications device 1100 to perform the method 900 described with respect to FIG. 9, and/or any aspect related to it.

The one or more processors 1110 include circuitry configured to implement (e.g., execute) the code stored in the computer-readable medium/memory 1125, including circuitry such as circuitry for outputting (or transmitting) 1115, circuitry for obtaining (or receiving) 1116, and circuitry for adjusting 1117. Processing with the circuitry for outputting 1115, the circuitry for obtaining 1116, and the circuitry for adjusting 1117 may cause the communications device 1100 to perform the method 1000 described with respect to FIG. 10, and/or any aspect related to it.

Various components of the communications device 1100 may provide means for performing the method 900 described with respect to FIG. 9, and/or any aspect related to it. For example, means for transmitting, sending or outputting for transmission may include transceivers 354 and/or antenna(s) 352 of the UE 104 illustrated in FIG. 3 and/or the code for outputting 1130, the circuitry for outputting 1115, the transceiver 1145 and the antenna 1150 of the communications device 1100 in FIG. 11. Means for receiving or obtaining may include transceivers 354 and/or antenna(s) 352 of the UE 104 illustrated in FIG. 3 and/or the code for obtaining 1131, the circuitry for obtaining 1116, the transceiver 1145 and the antenna 1150 of the communications device 1100 in FIG. 11. Means for adjusting may include transceivers 354, antenna(s) 352, controller/processor 380 of the UE 104 illustrated in FIG. 3 and/or the code for adjusting 1132, the circuitry for adjusting 1117, and the one or more processors 1110 of the communications device 1100 in FIG. 11.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. In various aspects, an RF front end may include various components, including transmit and receive processors, transmit and receive MIMO processors, modulators, demodulators, and the like, such as depicted in the examples in FIG. 3.

In some cases, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 3. Notably, FIG. 11 is an example, and many other examples and configurations of communication device 1100 are possible.

FIG. 12 depicts aspects of an example communications device 1200. In some aspects, the communications device 1200 is a network entity, such as BS 102 of FIG. 1 and FIG. 3, or a disaggregated BS as discussed with respect to FIG. 2.

The communications device 1200 includes a processing system 1205 coupled to a transceiver 1255 (e.g., a transmitter and/or a receiver) and/or a network interface 1265. The transceiver 1255 is configured to transmit and receive signals for the communications device 1200 via an antenna 1260, such as the various signals as described herein. The network interface 1265 is configured to obtain and send signals for the communications device 1200 via communication link(s), such as a backhaul link, midhaul link, and/or fronthaul link as described herein, such as with respect to FIG. 2. The processing system 1205 may be configured to perform processing functions for the communications device 1200, including processing signals received and/or to be transmitted by the communications device 1200.

The processing system 1205 includes one or more processors 1210. In various aspects, one or more processors 1210 may be representative of one or more of receive processor 338, transmit processor 320, TX MIMO processor 330, and/or controller/processor 340, as described with respect to FIG. 3. The one or more processors 1210 are coupled to a computer-readable medium/memory 1230 via a bus 1250. In certain aspects, the computer-readable medium/memory 1230 is configured to store instructions (e.g., computer-executable code) that when executed by the one or more processors 1210, cause the one or more processors 1210 to perform the method 1000 described with respect to FIG. 10, or any aspect related to it. Note that reference to a processor of communications device 1200 performing a function may include the one or more processors 1210 of communications device 1200 performing that function.

In the depicted example, the computer-readable medium/memory 1230 stores code (e.g., executable instructions), such as code for obtaining (or receiving) 1235 and code for outputting (or transmitting) 1240. Processing of the code for obtaining 1235 and the code for outputting 1240 may cause the communications device 1200 to perform the method 1000 described with respect to FIG. 10, or any aspect related to it.

The one or more processors 1210 include circuitry configured to implement (e.g., execute) the code stored in the computer-readable medium/memory 1230, including circuitry such as circuitry for obtaining (or receiving) 1215 and circuitry for outputting (or transmitting) 1220. Processing with the circuitry for obtaining 1215 and the circuitry for outputting 1220 may cause the communications device 1200 to perform the method 1000 described with respect to FIG. 10, or any aspect related to it.

Various components of the communications device 1200 may provide means for performing the method 1000 described with respect to FIG. 10, or any aspect related to it. Means for transmitting, sending or outputting for transmission may include transceivers 332 and/or antenna(s) 334 of the BS 102 illustrated in FIG. 3 and/or the circuitry for outputting 1220, the code for outputting 1240, the transceiver 1255 and the antenna 1260 of the communications device 1200 in FIG. 12. Means for receiving or obtaining may include transceivers 332 and/or antenna(s) 334 of the BS 102 illustrated in FIG. 3 and/or the circuitry for obtaining 1215, the code for obtaining 1235, the transceiver 1255 and the antenna 1260 of the communications device 1200 in FIG. 12.

In some cases, rather than actually transmitting, for example, signals and/or data, a device may have an interface to output signals and/or data for transmission (a means for outputting). For example, a processor may output signals and/or data, via a bus interface, to an RF front end for transmission. In various aspects, an RF front end may include various components, including transmit and receive processors, transmit and receive MIMO processors, modulators, demodulators, and the like, such as depicted in the examples in FIG. 3.

In some cases, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 3. Notably, FIG. 12 is an example, and many other examples and configurations of communication device 1200 are possible.

According to certain aspects, means for obtaining, means for receiving, means for outputting, means for transmitting, means for adjusting, and/or means for calculating may include one or more processors, such as depicted in FIG. 3.

Example Clauses

Implementation examples are described in the following numbered clauses:

Clause 1: A method for wireless communications at a network node, comprising: outputting, for transmission, beamforming capability information indicating one or more adaptive beam weights; obtaining, after outputting the beamforming capability information, an indication of beamforming adjustment phase information, wherein the beamforming adjustment phase information is based on circuit-level information of the network node associated with at least one of an adaptive beam weight synthesis period or an adaptive beam weight usage period; and adjusting the one or more adaptive beam weights based on the indication.

Clause 2: The method of clause 1, wherein at least one of: the adaptive beam weight synthesis period corresponds to a period for learning the one or more adaptive beam weights; the adaptive beam weight usage period corresponds to a period for using the one or more adaptive beam weights; the circuit-level information comprises a first quantity of active components of a circuit of the network node during the adaptive beam weight synthesis period and a second quantity of the active components of the circuit of the UE during the adaptive beam weight usage period; or the first quantity of the active components is different than the second quantity of the active components.

Clause 3: The method of any one of clauses 1-2, wherein the adjustment comprises: calculating a value of a beam weight adjustment based on the beamforming adjustment phase information; and adjusting a value of an adaptive beam weight based on the value of the beam weight adjustment.

Clause 4: The method of clause 3, wherein: the value of the adaptive beam weight indicates a first quantity of active antenna elements at the network node; the value of the beam weight adjustment indicates a second quantity of active antenna elements at the network node; and the first quantity of active antenna elements is different from the second quantity of active antenna elements.

Clause 5: The method of any one of clauses 1-4, further comprising obtaining, after outputting the beamforming capability information, beamforming assistance information indicating a quantity of reference signals (RSs) to be transmitted to the network node for a beam weight adjustment learning phase at the network node, wherein the adjusting of the one or more adaptive beam weights occurs during the beam weight adjustment learning phase.

Clause 6: The method of clause 5, wherein the quantity of RSs is based on at least one of: the one or more adaptive beam weights or a quantity of antenna elements activated by the one or more adaptive beam weights at the network node.

Clause 7: The method of clause 5, wherein the beamforming assistance information indicates at least one of: a type of each RS from the quantity of RSs or a transmission time of each RS from the quantity of RSs to the network node.

Clause 8: The method of clause 5, further comprising adjusting a current value of an adaptive beam weight based on a beam weight adjustment matrix corresponding to measurements associated with one or more RSs from the quantity of RSs.

Clause 9: The method of clause 8, wherein the beam weight adjustment matrix is based on a quantity of antenna elements at the network node.

Clause 10: The method of clause 8, wherein the beam weight adjustment matrix is based on a quantity and performance of radio frequency integrated circuits (RFICs) at the network node.

Clause 11: The method of clause 8, further comprising adjusting the current value of the adaptive beam weight to a true value of the adaptive beam weight, said adjustment being based on an application of the beam weight adjustment matrix on the current value of the adaptive beam weight.

Clause 12: The method of any one of clauses 1-11, further comprising adjusting a current value of an adaptive beam weight to a true value of the adaptive beam weight, said adjustment occurring each time the beamforming capability information indicating the one or more adaptive beam weights is outputted.

Clause 13: The method of any one of clauses 1-12, further comprising adjusting a current value of an adaptive beam weight to: a first true value of the adaptive beam weight for an uplink operation and a second true value of the adaptive beam weight for a downlink operation, wherein the first true value is different from the second true value.

Clause 14: The method of any one of clauses 1-13, further comprising semi-persistently adjusting a current value of an adaptive beam weight to a true value of the adaptive beam weight, said adjustment occurring after each defined time interval.

Clause 15: A method for wireless communications at a network node, comprising: obtaining beamforming capability information indicating one or more adaptive beam weights being used by a user equipment (UE); and outputting, for transmission, after obtaining the beamforming capability information, an indication of beamforming adjustment phase information for adjusting the one or more adaptive beam weights, wherein the beamforming adjustment phase information is based on circuit-level information of the UE during an adaptive beam weight synthesis period and an adaptive beam weight usage period.

Clause 16: The method of clause 15, wherein at least one of: the adaptive beam weight synthesis period corresponds to a period for learning the one or more adaptive beam weights; the adaptive beam weight usage period corresponds to a period for using the one or more adaptive beam weights; the circuit-level information comprises a first quantity of active components of a circuit of the UE during the adaptive beam weight synthesis period and a second quantity of the active components of the circuit of the UE during the adaptive beam weight usage period; or the first quantity of the active components is different than the second quantity of the active components.

Clause 17: The method of any one of clauses 15-16, further comprising outputting, for transmission, after obtaining the beamforming capability information, beamforming assistance information indicating a quantity of reference signals (RSs) to be transmitted to the UE for a beam weight adjustment learning phase at the UE.

Clause 18: The method of clause 17, wherein the quantity of RSs is based on at least one of: the one or more adaptive beam weights or a quantity of antenna elements activated by the one or more adaptive beam weights at the UE.

Clause 19: The method of clause 17, wherein the beamforming assistance information indicates at least one of: a type of each RS from the quantity of RSs or a transmission time of each RS from the quantity of RSs to the UE.

Clause 20: An apparatus, comprising: a memory comprising executable instructions; and one or more processors configured, individually or in any combination, to execute the executable instructions and cause the apparatus to perform a method in accordance with any one of Clauses 1-19.

Clause 21: An apparatus, comprising means for performing a method in accordance with any one of Clauses 1-19.

Clause 22: A non-transitory computer-readable medium comprising executable instructions that, when executed by one or more processors of an apparatus, cause the apparatus to perform a method in accordance with any one of Clauses 1-19.

Clause 23: A computer program product embodied on a computer-readable storage medium comprising code for performing a method in accordance with any one of Clauses 1-19.

Clause 24: A user equipment (UE), comprising: at least one transceiver; a memory comprising executable instructions; and one or more processors configured, individually or in any combination, to execute the executable instructions and cause the UE to perform a method in accordance with any one of Clauses 1-14, wherein the at least one transceiver is configured to: transmit the beamforming capability information and receive the beamforming adjustment phase information.

Clause 25: A network entity, comprising: at least one transceiver; a memory comprising executable instructions; and one or more processors configured, individually or in any combination, to execute the executable instructions and cause the network entity to perform a method in accordance with any one of Clauses 15-19, wherein the at least one transceiver is configured to: receive the beamforming capability information and transmit the beamforming adjustment phase information.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, "a processor," "at least one processor" or "one or more processors" generally refers to a single processor configured to perform one or multiple operations or multiple processors configured to collectively perform one or more operations. In the case of multiple processors, performance the one or more operations could be divided amongst different processors, though one processor may perform multiple operations, and multiple processors could collectively perform a single operation. Similarly, "a memory," "at least one memory" or "one or more memories" generally refers to a single memory configured to store data and/or instructions, multiple memories configured to collectively store data and/or instructions.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. An apparatus for wireless communications, comprising:
   at least one memory comprising instructions; and
   one or more processors configured, individually or in any combination, to execute the instructions and cause the apparatus to:
   output, for transmission, beamforming capability information indicating one or more adaptive beam weights;
   obtain, after outputting the beamforming capability information, an indication of beamforming adjustment phase information, wherein the beamforming adjustment phase information is based on circuit-level information of the apparatus associated with at least one of an adaptive beam weight synthesis period or an adaptive beam weight usage period; and
   adjust the one or more adaptive beam weights based on the indication.

2. The apparatus of claim 1, wherein at least one of:
   the adaptive beam weight synthesis period corresponds to a period for learning the one or more adaptive beam weights;
   the adaptive beam weight usage period corresponds to a period for using the one or more adaptive beam weights;
   the circuit-level information comprises a first quantity of active components of a circuit of the apparatus during the adaptive beam weight synthesis period and a second quantity of the active components of the circuit of the apparatus during the adaptive beam weight usage period; or
   the first quantity of the active components is different than the second quantity of the active components.

3. The apparatus of claim 1, wherein the adjust comprises:
   calculate a value of a beam weight adjustment based on the beamforming adjustment phase information; and
   adjust a value of an adaptive beam weight based on the value of the beam weight adjustment.

4. The apparatus of claim 3, wherein:
   the value of the adaptive beam weight indicates a first quantity of active antenna elements at the apparatus; the value of the beam weight adjustment indicates a second quantity of active antenna elements at the apparatus; and
   the first quantity of active antenna elements is different from the second quantity of active antenna elements.

5. The apparatus of claim 1, wherein the one or more processors are configured, individually or in any combination, to execute the instructions and cause the apparatus to obtain, after outputting the beamforming capability information, beamforming assistance information indicating a quantity of reference signals (RSs) to be transmitted to the apparatus for a beam weight adjustment learning phase at the apparatus, wherein the adjusting of the one or more adaptive beam weights occurs during the beam weight adjustment learning phase.

6. The apparatus of claim 5, wherein the quantity of RSs is based on at least one of: the one or more adaptive beam weights or a quantity of antenna elements activated by the one or more adaptive beam weights at the apparatus.

7. The apparatus of claim 5, wherein the beamforming assistance information indicates at least one of: a type of each RS from the quantity of RSs or a transmission time of each RS from the quantity of RSs to the apparatus.

8. The apparatus of claim 5, wherein the one or more processors are configured, individually or in any combination, to execute the instructions and cause the apparatus to adjust a current value of an adaptive beam weight based on a beam weight adjustment matrix corresponding to measurements associated with one or more RSs from the quantity of RSs.

9. The apparatus of claim 8, wherein the beam weight adjustment matrix is based on a quantity of antenna elements at the apparatus.

10. The apparatus of claim 8, wherein the beam weight adjustment matrix is based on a quantity and performance of radio frequency integrated circuits (RFICs) at the apparatus.

11. The apparatus of claim 8, wherein the one or more processors are configured, individually or in any combination, to execute the instructions and cause the apparatus to adjust the current value of the adaptive beam weight to a true value of the adaptive beam weight, said adjustment being based on an application of the beam weight adjustment matrix on the current value of the adaptive beam weight.

12. The apparatus of claim 1, wherein the one or more processors are configured, individually or in any combination, to execute the instructions and cause the apparatus to adjust a current value of an adaptive beam weight to a true value of the adaptive beam weight, said adjustment occurring each time the beamforming capability information indicating the one or more adaptive beam weights is outputted.

13. The apparatus of claim 1, wherein the one or more processors are configured, individually or in any combination, to execute the instructions and cause the apparatus to adjust a current value of an adaptive beam weight to: a first true value of the adaptive beam weight for an uplink operation and a second true value of the adaptive beam weight for a downlink operation, wherein the first true value is different from the second true value.

14. The apparatus of claim 1, wherein the one or more processors are configured, individually or in any combination, to execute the instructions and cause the apparatus to semi-persistently adjust a current value of an adaptive beam weight to a true value of the adaptive beam weight, said adjustment occurring after each defined time interval.

15. The apparatus of claim 1, further comprising at least one transceiver configured to:
- transmit the beamforming capability information; and
- receive the beamforming adjustment phase information, and wherein the apparatus is configured as a user equipment (UE).

16. An apparatus for wireless communications, comprising:
- at least one memory comprising instructions; and
- one or more processors configured, individually or in any combination, to execute the instructions and cause the apparatus to:
  - obtain beamforming capability information indicating one or more adaptive beam weights being used by a user equipment (UE); and
  - output, for transmission, after obtaining the beamforming capability information, an indication of beamforming adjustment phase information for adjusting the one or more adaptive beam weights, wherein the beamforming adjustment phase information is based on circuit-level information of the UE during an adaptive beam weight synthesis period and an adaptive beam weight usage period.

17. The apparatus of claim 16, wherein at least one of:
- the adaptive beam weight synthesis period corresponds to a period for learning the one or more adaptive beam weights;
- the adaptive beam weight usage period corresponds to a period for using the one or more adaptive beam weights;
- the circuit-level information comprises a first quantity of active components of a circuit of the UE during the adaptive beam weight synthesis period and a second quantity of the active components of the circuit of the UE during the adaptive beam weight usage period; or
- the first quantity of the active components is different than the second quantity of the active components.

18. The apparatus of claim 16, wherein the one or more processors are configured, individually or in any combination, to execute the instructions and cause the apparatus to output, for transmission, after obtaining the beamforming capability information, beamforming assistance information indicating a quantity of reference signals (RSs) to be transmitted to the UE for a beam weight adjustment learning phase at the UE.

19. The apparatus of claim 18, wherein the quantity of RSs is based on at least one of: the one or more adaptive beam weights or a quantity of antenna elements activated by the one or more adaptive beam weights at the UE.

20. The apparatus of claim 18, wherein the beamforming assistance information indicates at least one of: a type of each RS from the quantity of RSs or a transmission time of each RS from the quantity of RSs to the UE.

21. The apparatus of claim 16, further comprising at least one transceiver configured to:
- receive the beamforming capability information; and
- transmit the beamforming adjustment phase information, and wherein the apparatus is configured as a network entity.

22. A method for wireless communications at a network node, comprising:
- outputting, for transmission, beamforming capability information indicating one or more adaptive beam weights;
- obtaining, after outputting the beamforming capability information, an indication of beamforming adjustment phase information, wherein the beamforming adjustment phase information is based on circuit-level information of the network node associated with at least one of an adaptive beam weight synthesis period or an adaptive beam weight usage period; and
- adjusting the one or more adaptive beam weights based on the indication.

* * * * *